United States Patent
Deavers et al.

[11] Patent Number: 6,152,258
[45] Date of Patent: Nov. 28, 2000

[54] EXHAUST SYSTEM WITH SILENCING AND WATER SEPARATION CAPABILITY

[75] Inventors: Gregory B. Deavers; Loren T. Powers, both of Stillwater, Okla.

[73] Assignee: Brunswick Corporation, Lake Forest

[21] Appl. No.: 09/407,154

[22] Filed: Sep. 28, 1999

[51] Int. Cl.$^7$ ...................................................... F01N 7/18
[52] U.S. Cl. ........................ 181/282; 181/283; 181/272; 181/264; 181/221; 181/260; 181/234; 181/227; 181/239; 440/89
[58] Field of Search .................................. 181/282, 283, 181/272, 270, 264, 220, 221, 259, 260, 261, 233, 234, 235, 227, 238, 239; 440/89

[56] References Cited

U.S. PATENT DOCUMENTS

| | | |
|---|---|---|
| 753,845 | 3/1904 | Brockway et al. |
| 1,342,464 | 6/1920 | Sawders et al. |
| 2,498,979 | 2/1950 | Bourne ........................... 181/52 |
| 3,092,206 | 6/1963 | Moreau ........................... 181/68 |
| 4,019,456 | 4/1977 | Harbert ........................... 115/73 |
| 4,100,994 | 7/1978 | Stuart ............................ 181/261 |
| 4,154,265 | 5/1979 | Holsomback .................... 138/41 |
| 4,184,566 | 1/1980 | Baker et al. .................... 181/261 |
| 4,781,021 | 11/1988 | Winberg ......................... 60/309 |
| 4,977,977 | 12/1990 | Widmann et al. ............... 181/235 |
| 5,094,640 | 3/1992 | Burdick et al. ................. 440/89 |
| 5,196,655 | 3/1993 | Woods ............................ 181/235 |
| 5,444,196 | 8/1995 | Woods ............................ 181/227 |
| 5,504,280 | 4/1996 | Woods ............................ 181/235 |
| 5,616,893 | 4/1997 | Woods ............................ 181/235 |
| 5,625,173 | 4/1997 | Woods ............................ 181/227 |
| 5,894,115 | 4/1999 | Weiner ........................... 181/272 |
| 6,024,617 | 2/2000 | Smullin et al. ................. 440/89 |

*Primary Examiner*—Robert E. Nappi
*Assistant Examiner*—Edgardo San Martin
*Attorney, Agent, or Firm*—William D. Lanyi

[57] ABSTRACT

An exhaust system is provided with a structure that separates water from an exhaust stream and also attenuates the noise of the exhaust system. Water laden exhaust is directed from an inlet conduit through a perforated surface to precipitate water from the water laden exhaust stream. After the water is precipitated out of the exhaust stream, the gaseous portion of the exhaust stream continues from the inlet chamber 24 to an outlet chamber 28 and exits from the housing structure by passing through a first outlet conduit. The precipitated water passes from the housing structure through a second outlet conduit.

18 Claims, 3 Drawing Sheets

EXHAUST SYSTEM WITH SILENCING AND WATER SEPARATION CAPABILITY

BACKGROUND OF THE INVENTION

1. Field of the Invention

The present invention is generally related to an exhaust system which is able to separate water from an exhaust stream and, more specifically, to an exhaust system that is able to separate water from an exhaust stream and which also effectively reduces the noise emanating from the exhaust system.

2. Description of the Prior Art

Many different types of exhaust mufflers are known to those skilled in the art. These mufflers are typically constructed to provide sound attenuation through the use of acoustic insulation and baffles. In certain applications, such as marine exhaust systems, water is injected into the exhaust stream to cool the temperature of the exhaust stream.

U.S. Pat. No. 5,625,173, which issued to Woods on Apr. 29, 1997, describes a single baffle linear muffler for marine engines. The improved muffler for silencing the exhaust emitted from a water cooled marine engine employs a first outer housing encompassing a generally cone shaped inner member and forming a silencing volume therebetween and an angularly disposed inter planar baffle, inlet path, outlet path, ramp, and aperture for exhaust gas and cooling water to fluidly communicate from an inlet to an outlet resulting in a diminution in flow velocity so as to attenuate the exhaust noise.

U.S. Pat. No. 5,615,893, which issued to Woods on Apr. 1, 1997, describes a reverse entry muffler with surge suppression feature. The improved muffler for silencing the exhaust emitted from a marine engine employs a reverse entry inlet conduit, an attenuation chamber and an outlet conduit whereby exhaust gas and liquid are communicated through an inlet conduit and into the attenuation chamber against the direction of the outlet stream. Upon entering the attenuation chamber exhaust gases and liquids reflect the inner walls of the chamber and incoming exhaust thereby attenuating exhaust noise until they are finally forced out of the attenuation chamber through the outlet conduit. The reverse entry design of the muffler provides protection against backwardly flowing water that commonly enters a marine exhaust system by orienting the direction of inlet flow at an angle which is greater than 0 degrees but less than 90 degrees relative to the direction of output flow from the muffler.

U.S. Pat. No. 5,504,280, which issued to Woods on Apr. 2, 1996, discloses a muffler for marine engines. The muffler is intended to silence the exhaust emitted from a water cooled marine engine comprising a housing enclosure having a corrugated spacing means disposed within the housing partitioned by an angularly disposed inner planar baffle, the housing having an inlet for the exhaust gas and cooling water to fluidly communicate with a lower silencing chamber wherein the exhaust gas and cooling water are forced through a spacer passageway formed from the corrugated spacing means into an upper silencing chamber resulting in flow reversal and diminution in flow velocity so as to attenuate the exhaust noise, the exhaust gas and cooling water exiting the upper silencing chamber through an outlet fluidly communicated therewith and disposed collinearly with the input. The upper silencing chamber acts as a back flow preventor.

U.S. Pat. No. 5,444,196, which issued to Woods on Aug. 22, 1995, describes an in line insertion muffler for marine engines. The muffler employs a first housing encompassing a second housing which is partitioned by an angularly disposed inner planar baffle further having an inlet for exhaust gas and cooling water to fluidly communicate into an inlet chamber of the second housing resulting in a diminution in flow velocity so as to attenuate the exhaust noise, the exhaust gas and cooling water exiting the inlet chamber through an aperture fluidly communicated therewith into a silencing volume formed by an area between the first and second housing and forced through an aperture into an outlet chamber of the second housing. The outlet chambers acts as a back flow preventor.

U.S. Pat. No. 5,196,655, which issued to Woods on Mar. 23, 1993, describes a muffler for a marine engine. It comprises a housing enclosure partitioned by an angularly disposed inner planar baffle, the housing having an inlet for the exhaust gas and cooling water to fluidly communicate with a lower silencing chamber wherein the exhaust gas and cooling water are forced through a central passageway into an upper silencing chamber resulting in flow reversal and diminution in flow velocity so as to attenuate the exhaust noise, the exhaust gas and cooling water exiting the upper silencing chamber through an outlet fluidly communicated therewith and disposed collinearly with the input. The upper silencing chamber acts as a back flow preventor.

U.S. Pat. No. 5,094,640, which issued to Burdick et al. on Mar. 10, 1992, describes a marine engine noise suppressor with swim platform. The sound muffling devices for marine engines are installed on the external portion of the transom of a marine vessel and attached in such a way that any breakdown within the silencer causes no discharge of exhaust gases or cooling fluids into the interior of the vessel and the gases and cooling fluid continue to be discharged overboard. The silencers are designed to reduce, substantially, the noise level emitted by the engine under operation by the efficient mixture of gases and water through a series of baffles, with low resistance to gas flow that does not diminish engine efficiency.

U.S. Pat. No. 4,977,977, which issued to Von Widmann et al. on Dec. 18, 1990, describes a marine engine external exhaust noise suppressor with swim platform. The sound muffling devices for marine engines are installed on the external portion of the transom of a marine vessel and are attached in such a manner that any breakdown within the silencer causes no discharge of exhaust gases or cooling fluids into the interior of the vessel and the gases and cooling fluids continue to be discharged overboard. The device receives exhaust gas and cooling water from an exhaust pipe passing through the transom at the side of the boat and directs the gas to the center where it is exhausted. The device is designed to be used in pairs, with one of each pair of engines mounted side by side with an integral swim platform for its upper surface.

U.S. Pat. No. 4,781,021, which issued to Winberg on Nov. 1, 1988, describes a marine engine exhaust muffler assembly that includes inlet and outlet members, the axes of which are offset from each other. A muffler housing is disposed between the inlet and outlet members and forms a chamber having disposed therein an angular multi-layered cartridge, and with the layers having a multiplicity of perforations therein for passage of exhaust gases and spent engine cooling water therethrough. The water assists in keeping the muffler clean. An imperforate arcuate blocking plate is nested within the lower portion of the cartridge to permit accumulation of the spent engine cooling water within the cartridge to aid in noise reduction at certain engine speeds. The blocking plate is provided with a relief opening means for assisting in water drainage upon engine shutoff.

U.S. Pat. No. 4,184,566, which issued to Baker et al. on Jan. 22, 1980, describes a marine engine noise suppressor. The noise suppressor for an internal combustion engine exhaust, adapted for marine use wherein water coolant is discharged into the chamber of a single walled riser and partially vaporized by the exhaust gases directed into the dome thereof for downward redirection and discharge from the lower portion of the riser chamber through a muffler element, and preferably through the hull chest and/or cover of a jet pump drive acting as the final noise barrier to atmosphere.

U.S. Pat. No. 4,100,994, which issued to Stuart on Jul. 18, 1978, describes a marine exhaust silencer. The silencer quiets the exhaust output from a marine engine by injecting a spray of cooling water into the exhaust passageway to mix with and cool the exhaust gases before output from the passageway. The exhaust passageway preferably enlarges substantially in cross-sectional area in the region where the mixing occurs between the injected water and the exhaust gases for enhancing the cooling effect. An inlet scoop receives water as the boat moves forward, and the water is forced through a line and into the exhaust passageway in a way that breaks the water into droplets for contacting and cooling the exhaust gases. A mute that is preferably conical in shape and centered in the exhaust outlet also cooperates to reduce the exhaust noise.

U.S. Pat. No. 4,019,456, which issued to Harbert on Apr. 26, 1977, describes a marine wet exhaust system and improvements in powered marine vessels. The exhaust gas cooling water separation chamber is combined with a gas collection chamber and gas acceleration and gas flow-shaping conduit means. The entrance of the separation chamber is connectable to water coolant and gas exhaust tubes from a marine engine. The separation chamber is fitted with a water deflector disposed below the gas exit from that chamber while a gas dam is disposed in the water exit from that chamber, the entrance and water exit going below the deflector level.

The United States patents described above are explicitly incorporated herein by reference in the following description.

SUMMARY OF THE INVENTION

The present invention provides an exhaust system for a marine engine which performs two useful functions, separating water from the exhaust stream and silencing the noise of the exhaust system. The exhaust system of the present invention comprises a housing structure having a first pair of opposing sides, a second pair of opposing sides, a front side and a rear side. A divider is disposed within the housing structure and extends between the first pair of opposing sides to define an inlet chamber and an outlet chamber within the housing structure. The divider extends partially between the second pair of opposing sides to provide fluid communication through an inner connecting passage between the inlet and outlet chambers.

An inlet conduit is connected in fluid communication with the inlet chamber and a perforated surface is disposed within the inlet chamber between the inlet conduit and the divider. A first outlet conduit is disposed in fluid communication with the outlet chamber and a second outlet conduit is disposed in fluid communication with the outlet chamber, whereby an exhaust gas stream can flow from the inlet conduit to the first outlet conduit by passing sequentially into the inlet chamber, through the perforated surface, through the interconnecting passage, into the outlet chamber, and then through the first outlet passage.

In a particularly preferred embodiment of the present invention, the inlet conduit extends through the front side of the housing structure and the first outlet conduit extends through the rear side of the housing structure. During operation of the exhaust system of the present invention, the first pair of opposing sides comprises a top side and a bottom side. In other words, when the exhaust system is installed for use with an internal combustion engine, a preferred top side should be above the preferred bottom side of the housing structure.

The second outlet conduit extends through the bottom side of the housing structure and the first outlet extends into the housing structure at a location which is closer to the top side than to the bottom side.

In operation, a mixture of an exhaust gas stream and suspended water vapor flows into the housing structure through the inlet conduit and is separated, by the perforated surface, into a predominately gaseous stream and precipitated water. The water separated by the perforated surface collects at a lowest region of the housing structure proximate the bottom side and flows out of the housing structure through the second outlet conduit. The exhaust gas flows out of the housing structure through the first outlet conduit.

The inlet conduit of the present invention is connectable to an exhaust conduit of a marine engine and, in a particularly preferred embodiment of the present invention, the perforated surface is non-parallel to the divider. The inlet conduit is connected in fluid communication with the inlet chamber at a location closer to a first one of the second pair of opposing sides than to a second one of the second pair of opposing sides. The interconnecting passage is located closer to the second one of the second pair of opposing sides than to the first one of the second pair of opposing sides.

The first outlet conduit is connected in fluid communication with the outlet chamber, in a preferred embodiment of the present invention, at a location closer to the second one of the second pair of opposing sides than to the first one of the second pair of opposing sides.

Although a preferred embodiment of the present invention is manufactured of sheet metal, other components that are sufficient to withstand the temperatures in the exhaust stream can be used. In a typical application, the exhaust stream is cooled to a temperature of approximately 160 degrees F. prior to flowing into the inlet conduit of the present invention.

BRIEF DESCRIPTION OF THE DRAWINGS

The present invention will be more fully and completely understood from a reading of the description of the preferred embodiment, in conjunction with the drawings, in which.

DESCRIPTION OF THE PREFERRED EMBODIMENT

Figure 1:
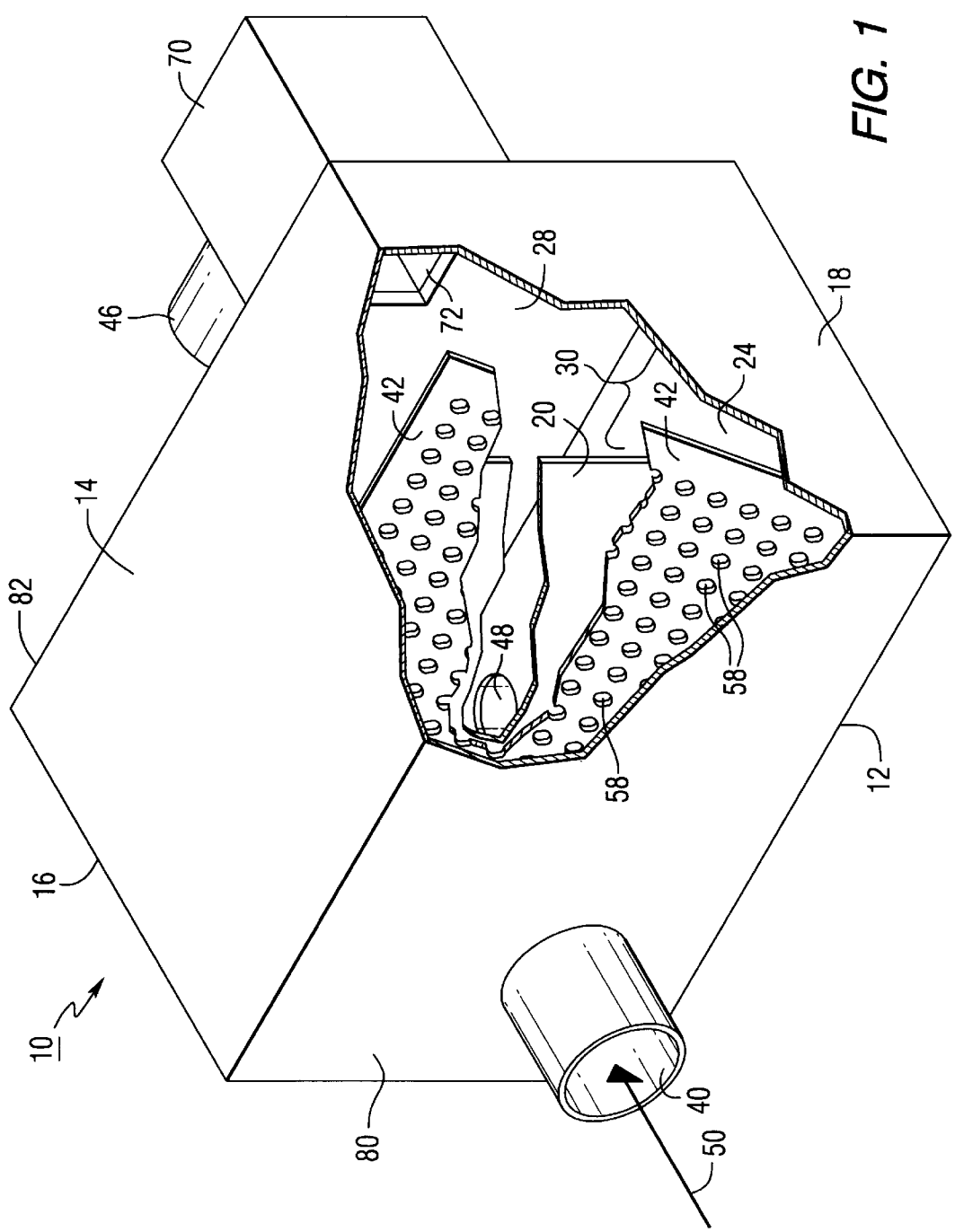
FIG. 1 is a cut-away isometric view of the present invention.

Throughout the description of the preferred embodiment of the present invention, like components will be identified by like reference numerals.

FIG. 1 shows the housing structure 10 of the present invention. The housing structure has a first pair of opposing sides, which comprises a first side 12 (not visible in FIG. 1) and a second side 14. It also comprises a second pair of opposing sides. The second pair of opposing sides comprises a first side 16 (not visible in FIG. 1) and a second side 18.

A portion of the housing structure 10 is cut away in FIG. 1 to expose a divider 20 which extends between the first pair of opposing sides, 12 and 14, to define an inlet chamber 24 and an outlet chamber 28 within the housing structure 10. The divider 20 extends partially between the second pair of opposing sides, 16 and 18, to provide fluid communication between the inlet chamber 24 and the outlet chamber 28 through an interconnecting passage 30.

With continued reference to FIG. 1, an inlet conduit 40 is connected in fluid communication with the inlet chamber 24 and a perforated surface 42 is disposed within the inlet chamber 24 between the inlet conduit 40 and the divider 20.

A first outlet conduit 46 is disposed in fluid communication with the outlet chamber 28 and a second outlet conduit 48 is disposed in fluid communication with the outlet chamber 28. As a result of the structure shown in FIG. 1, an exhaust gas stream, represented by arrow 50, can flow from the inlet conduit 40 to the first outlet conduit 46 by passing sequentially through the inlet chamber 24, through the perforated surface 42, through the interconnecting passage 30, through the outlet chamber 28, and then through the first outlet conduit 46.

Figure 2:
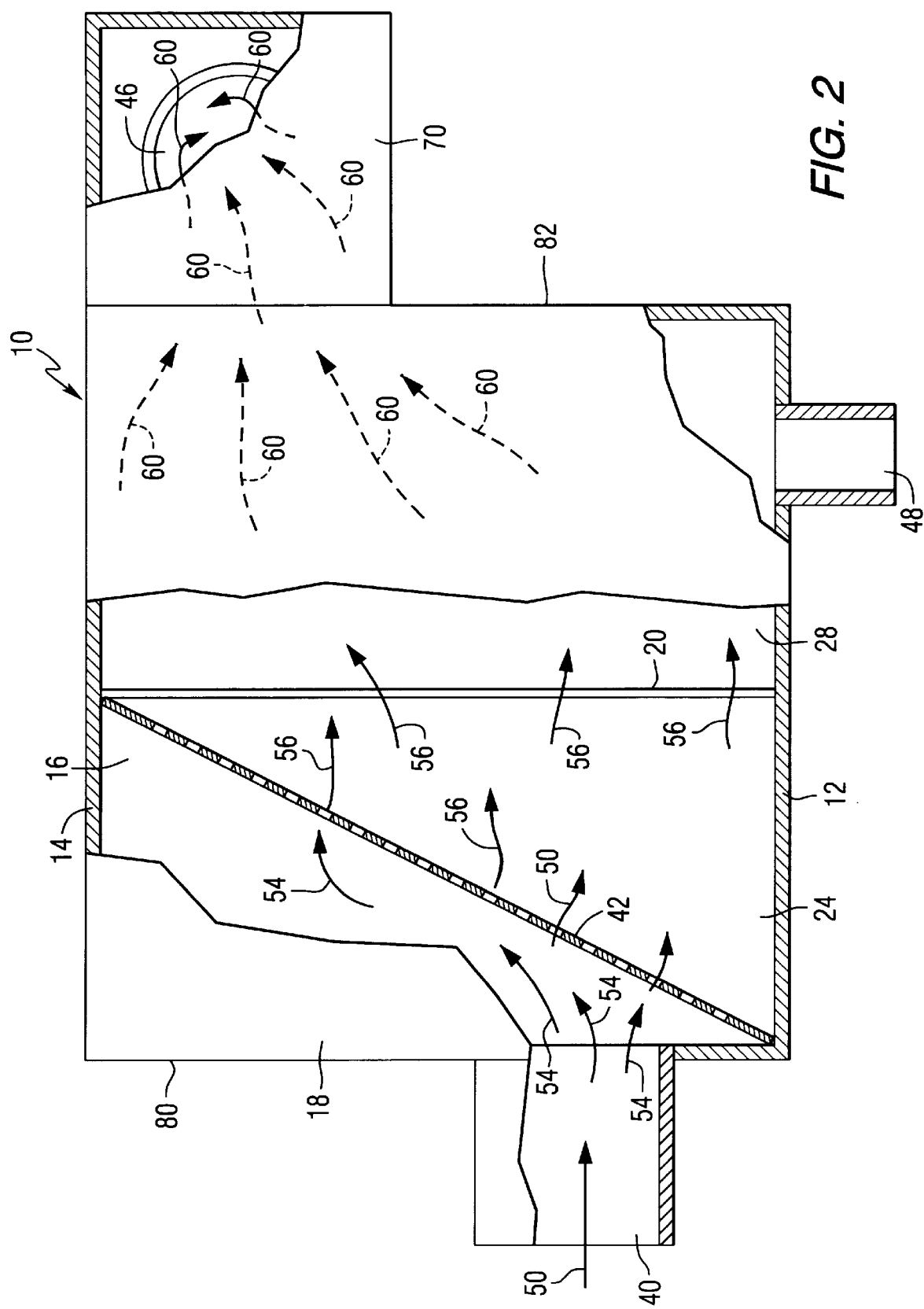
FIG. 2 is a cut-away side view of the present invention.

FIG. 2 is a partially sectioned side view of the housing structure 10 described above in conjunction with FIG. 1. Arrow 50 represents an exhaust mixture of exhaust gases and water. The exhaust gases and entrained water pass through the inlet conduit 40 and into the inlet chamber 24. The combined gas and water exhaust stream 50 then flows into contact with the perforated surface 42, as represented by arrows 54, and is forced to pass through the perforations of the perforated surface 42. The perforations are identified by reference numeral 58 in FIG. 1. It should be understood that the perforations can be formed in any one of several ways. They can comprise round or ovate holes or, alternatively, the perforated surface 42 can be a sheet of expanded metal. As the exhaust stream strikes the perforated surface 42 and passes through its openings, water is precipitated from the gaseous stream. The water condenses on the perforated surface 42 and then drops to the bottom portion of the housing structure 10. As a significant portion of the entrained water precipitates from the exhaust stream, the remaining gaseous portion of the exhaust stream will continue, as represented by arrows 56, around the edge of the divider 20 and through the interconnecting passage 30 as described above in conjunction with FIG. 1. The gaseous portion of the exhaust stream then continues to flow through the outlet chamber 28, as represented by arrows 60, and out through the first outlet conduit 46. The water that precipitates from the incoming exhaust stream 50 collects at the bottom portion of the housing structure 10 and can flow out of the housing structure 10 through the second outlet conduit 48. The pressure within the outlet chamber 28 assists in evacuating the water through the second outlet conduit 48 by creating a pressure above the collected water in the bottom portion of the housing structure 10 that is greater than the pressure within the second outlet conduit 48. This pressure differential forces the water downward and out of the housing structure 10 through the second outlet conduit 48.

The drier exhaust gas, represented by arrows 56 and 60, passes through the first exhaust conduit 46. In FIGS. 1 and 2, the first outlet conduit 46 is shown connected to a box-like structure 70 that provides a passage between an opening 72 in the rear side of the housing structure 10 and the first outlet conduit 46. However, it should be understood that the box-like structure 70 is not a requirement in all embodiments of the present invention. Instead, a first outlet conduit 46 can be connected directly to an opening 72 formed in the rear side of the housing structure 10. In addition, it should be understood that the first outlet conduit 46 does not have to be located at the end of the housing structure 10 that is nearest to the second one 18 of the second pair of opposing sides. Alternatively, it can be located at the opposite end of the rear side and disposed more closely to the first one 16 of the second pair of opposing sides.

Figure 3:
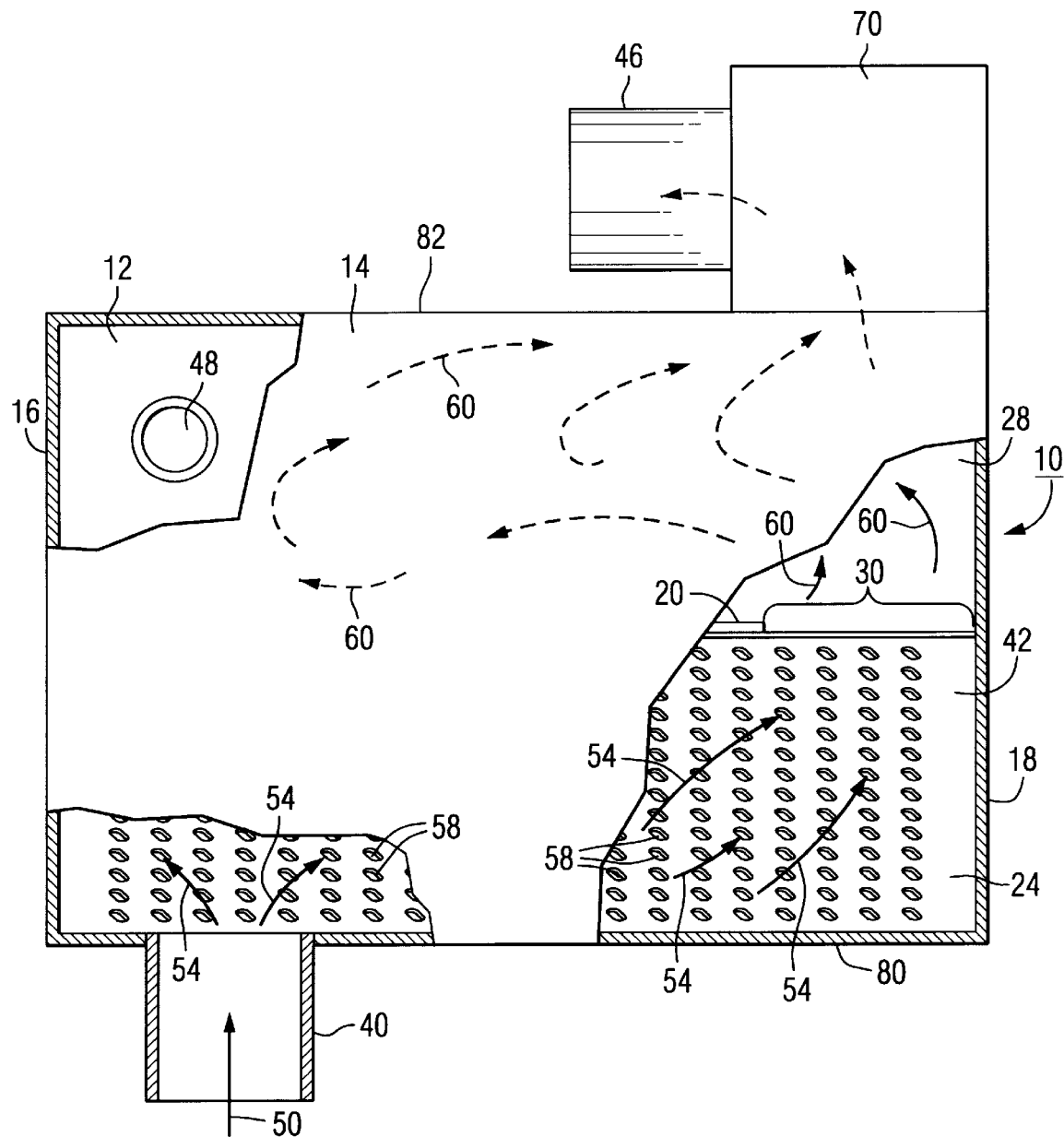
FIG. 3 is a cut-away top view of the present invention.

FIG. 3 shows a top view of the housing structure 10 with a portion of the second one 14 of the first pair of opposing sides cut away to expose various internal components. In FIG. 3, the exhaust stream 50 can be seen entering the inlet chamber 24 through the inlet conduit 40. The exhaust stream passes into contact with the perforated surface 42 and passes through the plurality of perforations 58. As it passes through the perforated surface 42, water is precipitated from the moisture laden exhaust stream 50. After passing through the holes 58, the gas stream continues through the inlet chamber 24 and through the interconnecting passage 30 toward the outlet chamber 28.

In FIGS. 2 and 3, arrows 60 represent the path that the gaseous exhaust stream takes as it moves from the interconnecting passageway 30 toward the first outlet conduit 46. Since the outlet chamber 28 extends toward the first one 16 of the second pair of opposing sides, a pressure gradient can exist, wherein the pressure within the outlet chamber 28 near the first one 16 of the second pair of opposing sides can be higher than at the opposite end of the outlet chamber 28 closer to the second one 18 of the second pair of opposing sides. This pressure differential can assist in forcing water downward through the bottom side 12 of the housing structure 10 and through the second outlet conduit 48. This assists in evacuating water which collects at the bottom portion of the housing structure 10.

With reference to FIGS. 1, 2, and 3, the housing structure 10 and its internal structures also provide a sound attenuation structure which reduces the overall sound level of the exhaust system. It can be seen that the divider 20 does not extend completely between the second pair of opposing sides, 16 and 18. Instead, it extends partially across the distance between the second pair of opposing sides to define an interconnecting passageway 30 between the inlet chamber 24 and the outlet chamber 28. This forces the exhaust stream to pass from the inlet conduit 40 and along the length of the inlet chamber 24 before passing through the interconnecting passageway 30 and into the outlet chamber 28.

With reference to FIGS. 1, 2, and 3, it can be seen that the housing structure 10 has a first pair of opposing sides, 12 and 14, which are also its bottom side and top side, respectively. The housing structure 10 also has a second pair of opposing sides, 16 and 18, a front side 80 and rear side 82. The divider 20 is disposed within the housing structure 10 and extends between the first pair of opposing sides, 12 and 14, to divide the housing structure into an inlet chamber 24 and an outlet chamber 28. The divider 20 also can be seen as partially extending between the second pair of opposing sides, 16 and 18, to define the interconnecting passageway 30 between the one edge of the divider 20 and the second one 18 of the second pair of opposing sides. The inlet conduit 40 is connected in fluid communication with the inlet chamber 24 and the perforated surface 42 is disposed within the inlet chamber 24 between the inlet conduit 40 and the divider 20. As can be seen most clearly in FIGS. 1 and 2, the perforated surface 42 is disposed in non-parallel relation with the divider 20. It has been found that this non-parallel association, where the perforated surface 42 extends from the front corner at the bottom of the housing structure 10 to the upper corner between the divider 20 and the second one 14 of the first pair of opposing sides, 12 and 14. However, this slanted arrangement of the perforated surface 42 is not a requirement in all embodiments of the present invention.

The first outlet conduit 46 is disposed in fluid communication with the outlet chamber 28 through opening 72 which is described above in conjunction with FIG. 1. A second outlet conduit 48 is disposed in fluid communication with the outlet chamber 28 and, in a preferred embodiment of the present invention, extends through the bottom side of the housing structure 10.

The internal configuration of the housing structure 10 forces the exhaust gas to pass through the perforated surface 42 and thus causes the water to precipitate from the exhaust stream. The gaseous portion of the exhaust stream then continues to flow through the inlet chamber 24, the interconnecting passageway 30, and the outlet chamber 28 to the first outlet conduit 46. The precipitated water falls to the bottom portion of the housing structure 10 and is forced through the second outlet conduit 48 by the pressure above the collected water in the bottom portion of the structure.

As described above, in a preferred embodiment of the present invention, the inlet conduit 40 is connected in fluid communication with the inlet chamber 24 at a location that is closer to a first one 16 of a second pair of opposing sides, than to the second one 18 of the second pair of opposing sides. In addition, the interconnecting passage 30 is located closer to the second one 18 of the second pair of opposing sides than to the first one 16 of the first pair of opposing sides. The first outlet conduit 46 is connected in fluid communication, in a preferred embodiment of the present invention, with the outlet chamber 28 at a location that is closer to the second one 18 of the second pair of opposing sides than to the first one 16 of the second pair of opposing sides.

Although the present invention has been described with particular detail and illustrated to show a preferred embodiment of the present invention, it should be understood that other embodiments are also within its scope.

What is claimed is:

1. An exhaust system, comprising:

a housing structure having a first pair of opposing sides, a second pair of opposing sides, a front side, and a rear side;

a divider disposed within said housing structure and extending between said first pair of opposing sides to define an inlet chamber and an outlet chamber within said housing structure, said divider extending partially between said second pair of opposing sides to provide fluid communication through an interconnecting passage between said inlet and outlet chambers;

an inlet conduit connected in fluid communication with said inlet chamber;

a perforated surface disposed within said inlet chamber between said inlet conduit and said divider;

a first outlet conduit disposed in fluid communication with said outlet chamber; and a second outlet conduit disposed in fluid communication with said outlet chamber, whereby an exhaust gas stream can flow from said inlet conduit to said first outlet conduit by passing sequentially into said inlet chamber, through said perforated surface, through said interconnecting passage, into said outlet chamber, and then through said first outlet conduit, said inlet conduit is connected in fluid communication with said inlet chamber at a location closer to a first one of said second pair of opposing sides than to a second one of said second pair of opposing sides and said interconnecting passage is located closer to said second one of said second pair of opposing sides than to said first one of said second pair of opposing sides.

2. The exhaust system of claim 1, wherein:

said inlet conduit extends through said front side of said housing structure.

3. The exhaust system of claim 1, wherein:

said first outlet conduit extends through said rear side of said housing structure.

4. The exhaust system of claim 3, wherein:

during operation of said exhaust system, said first pair of opposing sides comprises a top side and a bottom side.

5. The exhaust system of claim 4, wherein:

said second outlet conduit extends through said bottom side of said housing structure.

6. The exhaust system of claim 4, wherein:

said first outlet extends into said housing structure at a location which is closer to said top side that to said bottom side.

7. The exhaust system of claim 1, wherein:

a mixture of an exhaust gas stream and suspended water vapor flowing into said housing structure through said inlet conduit is separated by said perforated surface into a predominantly gaseous stream and precipitated water.

8. The exhaust system of claim 7, wherein:

water separated by said perforated surface collects at a lowest region of said housing structure and flows out of said housing structure through said second outlet conduit and said exhaust gas stream flows out of said housing structure through said first outlet conduit.

9. The exhaust system of claim 1, wherein:

said inlet conduit is connectable to an exhaust conduit of a marine engine.

10. The exhaust system of claim 1, wherein:

said perforated surface is nonparallel to said divider.

11. The exhaust system of claim 1, wherein:

said first outlet conduit is connected in fluid communication with said outlet chamber at a location closer to said second one of said second pair of opposing sides than to said first one of said second pair of opposing sides.

12. The exhaust system of claim 1, wherein:

said housing structure is made of metal.

13. A marine exhaust system, comprising:

a housing structure having a first pair of opposing sides, a second pair of opposing sides, a front side, and a rear side;

a divider disposed within said housing structure and extending between said first pair of opposing sides to define an inlet chamber and an outlet chamber within said housing structure, said divider extending partially between said second pair of opposing sides to provide fluid communication through an interconnecting passage between said inlet and outlet chambers;

an inlet conduit connected in fluid communication with said inlet chamber;

a perforated surface disposed within said inlet chamber between said inlet conduit and said divider;

a first outlet conduit disposed in fluid communication with said outlet chamber; and a second outlet conduit disposed in fluid communication with said outlet chamber, said first outlet conduit extending through said rear side of said housing structure, during operation of said exhaust system said first pair of opposing sides comprises a top side and a bottom side, and said second outlet conduit extends through said bottom side of said housing structure, whereby an exhaust gas stream can flow from said inlet conduit to said first outlet conduit by passing sequentially into said inlet chamber, through said perforated surface, through said interconnecting passage, into said outlet chamber, and then through said first outlet conduit, said inlet conduit is connected in fluid communication with said inlet chamber at a location closer to a first one of said second pair of opposing sides than to a second one of said second pair of opposing sides and said interconnecting passage being located closer to said second one of said second pair of opposing sides than to said first one of said second pair of opposing sides and said first outlet conduit is connected in fluid communication with said outlet chamber at a location closer to said second one of said second pair of opposing sides than to said first one of said second pair of opposing sides.

14. The exhaust system of claim 13, wherein:

said inlet conduit extends through said front side of said housing structure and said first outlet extends into said housing structure at a location which is closer to said top side that to said bottom side.

15. The exhaust system of claim 14, wherein:

a mixture of an exhaust gas stream and suspended water vapor flowing into said housing structure through said inlet conduit is separated by said perforated surface into a predominantly gaseous stream and precipitated water and water separated by said perforated surface collects at a lowest region of said housing structure and flows out of said housing structure through said second outlet conduit and said exhaust gas stream flows out of said housing structure through said first outlet conduit.

16. The exhaust system of claim 13, wherein:

said perforated surface is nonparallel to said divider.

17. An exhaust system, comprising:

a housing structure having a first pair of opposing sides, a second pair of opposing sides, a front side, and a rear side;

a divider disposed within said housing structure and extending between said first pair of opposing sides to define an inlet chamber and an outlet chamber within said housing structure, said divider extending partially between said second pair of opposing sides to provide fluid communication through an interconnecting passage between said inlet and outlet chambers;

an inlet conduit connected in fluid communication with said inlet chamber;

a perforated surface disposed within said inlet chamber between said inlet conduit and said divider;

a first outlet conduit disposed in fluid communication with said outlet chamber; and a second outlet conduit disposed in fluid communication with said outlet chamber, said first outlet conduit extending through said rear side of said housing structure, during operation of said exhaust system said first pair of opposing sides comprises a top side and a bottom side, and said second outlet conduit extends through said bottom side of said housing structure, said inlet conduit extending through said front side of said housing structure and said first outlet extends into said housing structure at a location which is closer to said top side that to said bottom side, said inlet conduit being connected in fluid communication with said inlet chamber at a location closer to a first one of said second pair of opposing sides than to a second one of said second pair of opposing sides and said interconnecting passage being located closer to said second one of said second pair of opposing sides than to said first one of said second pair of opposing sides and said first outlet conduit being connected in fluid communication with said outlet chamber at a location closer to said second one of said second pair of opposing sides than to said first one of said second pair of opposing sides, whereby an exhaust gas stream can flow from said inlet conduit to said first outlet conduit by passing sequentially into said inlet chamber, through said perforated surface, through said interconnecting passage, into said outlet chamber, and then through said first outlet conduit, a mixture of an exhaust gas stream and suspended water vapor flowing into said housing structure through said inlet conduit being separated by said perforated surface into a predominantly gaseous stream and precipitated water and water separated by said perforated surface collects at a lowest region of said housing structure and flows out of said housing structure through said second outlet conduit and said exhaust gas stream flows out of said housing structure through said first outlet conduit.

18. The exhaust system of claim 17, wherein:

said perforated surface is nonparallel to said divider.

* * * * *